Nov. 1, 1966  R. L. HUTCHESON  3,282,654
CRYSTAL GROWING FURNACE WITH AN ALUMINA LINER
Filed May 18, 1964
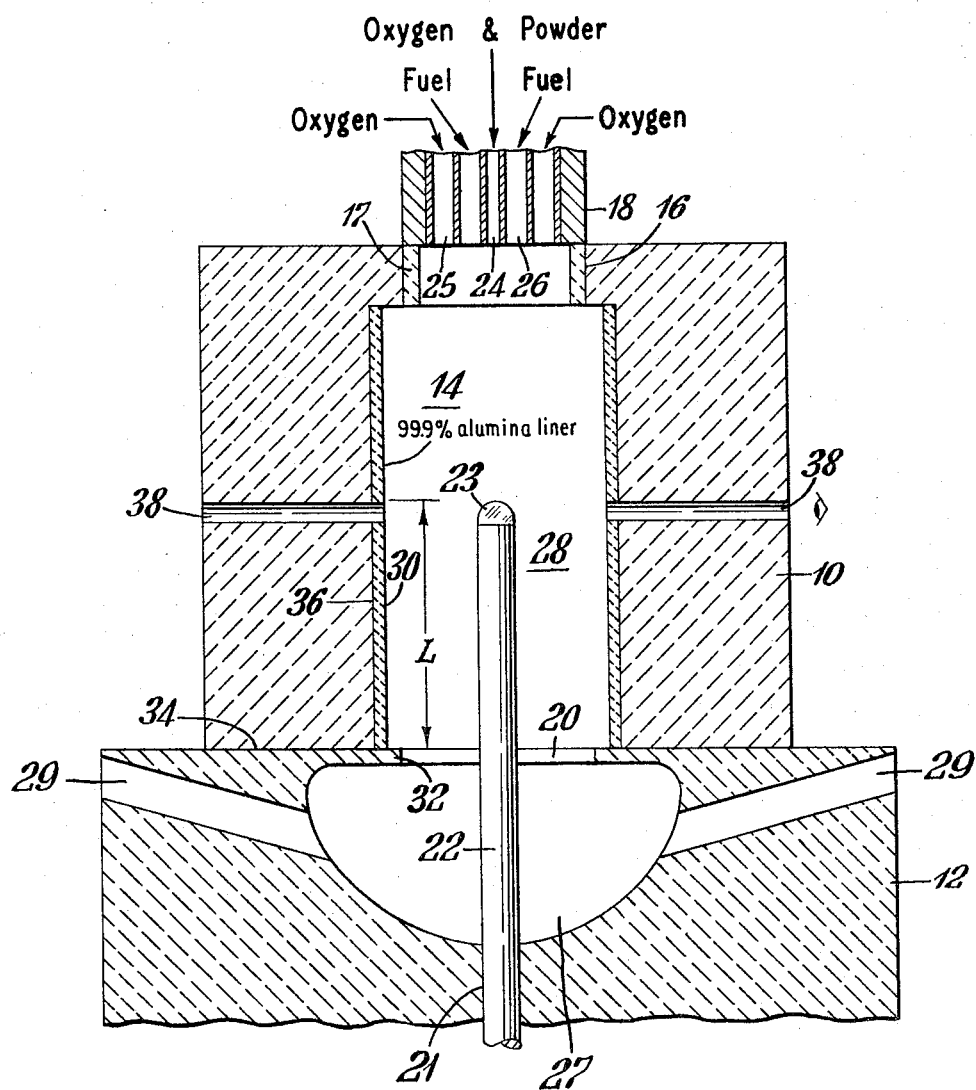
INVENTOR.
RALPH L. HUTCHESON
BY
Leo A. Plum, Jr.
ATTORNEY

United States Patent Office 3,282,654
Patented Nov. 1, 1966

3,282,654
CRYSTAL GROWING FURNACE WITH AN
ALUMINA LINER
Ralph L. Hutcheson, Gary, Ind., assignor to Union Carbide Corporation, a corporation of New York
Filed May 18, 1964, Ser. No. 368,149
11 Claims. (Cl. 23—273)

This invention relates to furnace apparatus and furnacing process for use in the flame fusion growth of synthetic unicrystalline bodies.

Synthetic crystal boules can be grown in special furnaces by fusing and depositing powdered crystalline constituent materials on a crystal seed. The powdered material can be fused in an oxyhydrogen flame which is directed at the crystal seed. The crystal boule grows by crystallization of the deposited material.

Synthetic sapphires and rubies can be prepared in the above-described process using high purity powdered alumina for sapphire growth, and alumina plus chromic oxide in the case of ruby growth. The materials must be of a high purity and the furnacing apparatus must be such as not to allow the introduction of foreign materials into the growing crystal. The presence of contaminants in a crystal body seriously impairs its usefulness, especially in regard to use of the crystal in high quality optical applications and in electronic applications such as lasers.

The high temperatures at which these crystal growing operations are conducted makes it difficult to find suitable, noncontaminating furnace construction materials. Ceramic materials such as 95 percent pure alumina ordinarily can be used in such applications because it has the necessary temperature and thermal shock resistance and is relatively inert. However, even with 95 percent purity alumina furnace parts, the high temperatures involved, on the order of 2000° C., cause this material to lose impurities which are picked up in the crystal. Such impurities, including calcium, as well as other impurities picked up in the furnace materials and refractory sealing cements, such as silica and magnesium, will be found in the finished crystal and will preclude its use in applications requiring high performance.

Another consideration is the need to maintain proper thermal conditions in the crystal growing zone. This is especially important in regard to maintaining the crystal growing zone with controlled thermal gradients.

It is the primary object of this invention to provide means for growing high perfection, contaminant-free crystal bodies.

It is also the object of this invention to provide a furnace structure which will not give off contaminating materials when operating at high temperatures in crystal growing operations.

It is a further object of this invention to provide furnace structure which promotes the maintenance of the uniform temperature conditions needed for growth of high perfection crystals.

Other aims and advantages of this invention will be apparent from the following description, the drawing and the appended claims.

According to the present invention, apparatus is provided comprising a furnace having a chamber, a top opening into said chamber, a second opening into said chamber, means for maintaining a support with a crystal seed thereon through an opening into said chamber to a crystal growing zone therein, burner means in the other opening, for directing flames and crystal constituent material into said chamber to impinge upon said crystal seed for crystal growth thereon, and a high purity, noncontaminating alumina liner disposed in said chamber laterally surrounding at least the crystal growing zone.

The single drawing shows a vertical sectional view of one embodiment of the apparatus of this invention.

With reference to the drawing, there is shown a small furnace 10 of heat resistant material which is mounted on pedestal 12. The furnace 10 may be made up of separate blocks which fit together to form the structure shown enclosing a furnace chamber 14. A top opening 16 in the furnace allows for the insertion of a metal burner 18. Bottom opening 20 in the furnace, as well as the opening 21 the pedestal, allow for the insertion of a crystal support 22 into the furnace chamber 14.

The burner 18 is placed in the opening 16 with its nozzle end directed inside the furnace chamber. The burner may be held in this position by overlying supports, not shown here. Oxygen is supplied continuously through passage 24, and powdered crystal constituent material, such as powdered alumina, is also delivered in a known manner through the passage 24 in the oxygen stream. Fuel gas such as hydrogen is delivered to the nozzle of the burner through passage 26. Additional oxygen is also fed through passage 25. The oxygen and hydrogen mix together after discharge from the burner to form, on ignition, an intensely hot downwardly directed flame which melts the powder passing therethrough. The spent gases from the furnace chamber pass through the opening 20 and into the bell-shaped chamber 27 and thence out the exhaust ports 29 in the pedestal 12.

The exhaust ports 29 are passages slanting down into the bell-shaped chamber 27 and are more or less tangent to the curve of the bottom of the bell-shaped chamber so as to allow for a smooth flow of spent gases from the bell-shaped chamber out through the ports.

The opening 21 in the bottom of the pedestal 12 should be made to fit as closely as possible to the crystal support 22 without preventing the vertical movement of the support so that gases will not enter or leave through the opening 21. The flame and fused powder impinge upon a crystal seed 23 initially held on or forming, the crystal support 22. The fused crystal material accumulates on the crystal seed to form a molten cap in a crystal growing zone 28. The crystal support 22 is withdrawn as the fused material builds up so as to maintain a proper relationship between the point of impingement of the flame and the crystal being grown. As molten crystal constituent material is moved into cooler areas, it crystallizes to form a solid crystal boule.

The furnace 10 and pedestal 12 may be constructed of low purity alumina, i.e., about 95 percent alumina with the balance mainly calcium. This material, as stated above, has the necessary high temperature strength and thermal shock resistance to withstand the temperatures involved. Additionally refractory cements may be used to seal the furnace to prevent influx of contaminants and maintain proper thermal conditions inside the furnace. Unfortunately, at the high temperatures involved, such a furnace would tend to lose impurities to the crystal growing zone 28 thereby contaminating any crystals grown therein. According to this invention a liner or sleeve 30 of high purity alumina, i.e., about 99.9 percent alumina, is disposed inside the chamber 14 preventing the escape of impurities from the lower purity furnace walls. The liner further shields the crystal growing zone 28 from impurities.

In a preferred embodiment of the invention, the pedestal 12 is provided with a circular shelf 32. The circular shelf surrounds and is concentric with the opening 20 in the pedestal. Thus the sleeve may be supported concentrically on the shelf without the need for any cementing thereby eliminating a possible source of contamination.

The high purity alumina sleeve 30 may be of an overall diameter such as to fit snugly along the inside walls 36 of the furnace chamber, or provision for a loose fitting with a space between the liner and the inside walls 36 of the furnace may be made. In any case cementing of the liner to the furnace walls is generally not necessary. Additionally, at the top of the furnace chamber where the top of the sleeve meets the furnace chamber roof, it is generally not necessary to have a tight fit, or a cemented fit, but only that the parts come in reasonably close contact, since the very high operating temperatures are not found in this area.

In this manner the furnace chamber can be made to present a very inert material, high purity alumina, to the flames. A completely high purity alumina furnace construction could not be employed because 99.9 percent alumina does not possess the thermal shock resistance needed to withstand the high temperature conditions involved due to the required thickness of the furnace. Such thickness is necessary in order to prevent heat loss to the atmosphere.

The high purity alumina liner may be constructed in the following manner: A Norton RA5190 99.3% $Al_2O_3$ alumina tube is positioned in the furnace and fired for 50 hours at 1930° C. This may be done during crystal growth. However, at least the first growing portion of the crystal will contain impurities. This process in effect vaporizes out substantially all of the unwanted impurities from the sleeve. The thickness of the liner may vary from ¼ to ½ inch.

The composition of the liner after the vaporizing process in the furnace is 99.95% $Al_2O_3$ with trace impurities of materials such as Si, Mg, Fe, Ca, Ga, Cu, Ag, and Ni.

Various shapes of liners may be made to fit various furnace types. Generally a cylindrical sleeve type liner will be used.

The high purity alumina liner being 99.95% pure greatly reduces the impurities in the final crystal product. This reduction in impurities yields an alumina-based crystal of superior quality as is shown in the table to follow.

Observation ports 38 may extend through the walls of the furnace and the liner to allow for observation of the crystal growing operation. These observation ports are placed at the level of the actual crystal growing zone and may be used as a location point for arrangement of the crystal seed prior to commencing the operation.

In operation the furnace may be prepared for use by placing the high purity alumina liner 30 onto the circular ledge 32 in the pedestal surface. The furnace structure may be built up around the liner or sleeve if the furnace is made up of several blocks; or, if the furnace 10 is a one piece unit, it may be lowered down around the liner. The burner, if not already attached to the furnace unit, may be lowered into the top opening.

The high purity alumina liner, in this case a cylindrical sleeve, is seen to extend up from the surface of the pedestal to the roof of the chamber. In this way a complete shielding of the chamber interior is accomplished. In the embodiment shown the burner 16 is fitted with a cylindrical sleeve extension 17 which may also be of high purity alumina if the flame from the burner contacts this area. In other cases, the area between the flame origin and the crystal growing zone should be shielded by the high purity alumina liner so that the flame will not strike any exposed low purity materials which would tend to give off impurities. The area below or past the crystal growing zone should also be shielded by a high purity alumina lining so that impurities boiled out of exposed low purity materials do not diffuse backward to the crystal growing zone. In the case illustrated, the liner 30 is seen to extend a distance L beyond the crystal growing area. The proper length of this extension of the liner beyond the crystal growing zone has been found to be related to the diameter of the furnace chamber in regard to the backward diffusion of impurities as well as to the maintenance of the proper thermal conditions.

Generally speaking the furnace chamber should be long and closely confined. This will allow the flame to flow symmetrically past the seed and crystal growing zone and prevent the formation of excessive thermal gradients therearound. While it might appear that a comparatively long extension L of the liner would be desirable to completely prevent back diffusion of impurities from the pedestal area, it has been found that a long extension of the furnace chamber beyond the crystal growing zone is not necessary and, in fact, does not produce favorable crystal growing conditions.

It has been found that the inside diameter of the crystal growing chamber is of utmost importance and especially its relationship to the length of the extension L. The size of the furnace and the diameter of the chamber are initially governed by the size and type of crystal to be grown. The length of the extension L should then be set in regard to the inner diameter of the liner I.D. (which is, in effect, the diameter of the chamber) such that the ratio of the length L to the inner diameter is between about 1 and 5. The ratio L/I.D. should be at least 1 to prevent backward diffusion of impurities. The ratio L/I.D. should not greatly exceed 5 or the control of the flaming gases will be lost and improper thermal gradient conditions will be found in the crystal growing zone. By maintaining the ratio L/I.D. within the limits 1 to 5, protection of the crystal growing zone from contaminants will be achieved as well as the maintenance of the proper thermal conditions in the crystal growing zone. Therefore, in a preferred form of the invention, the ratio L/I.D. should be maintained within the indicated limits. The use of the port holes 29, is another feature of this apparatus. More specifically, if the gases were allowed to exhaust out the bottom of the pedestal, the furnace would in effect act as a chimney, with its accompanying updrafts. Such drafts would cause temperature fluctuations in the crystal growing zone. By having the close fitting opening 21 and exhausting the gases out the holes 29, this problem is eliminated.

In an example of the procedure of this invention a ruby rod was grown in apparatus of the type shown in the drawing. The crystal boule grown had a diameter of about ¾ inch and a length of 13½ inches. The furnace was constructed of 95 percent alumina with a 99.95 percent alumina cylindrical sleeve liner as shown in the drawing. The total height of the liner and hence of the chamber itself, was 10½ inches. The inner diameter of the liner, and hence the inner diameter of the chamber was 2 inches. The crystal support with a seed crystal thereon was mounted in the furnace with the seed crystal in the crystal growing zone. The distance L by which the liner extended beyond the top of the seed crystal, which is approximately the same as the crystal growing zone, was 3½ inches. The furnace chamber and its high purity alumina liner thus had a L/I.D. ratio of 3½/2 equal to 1.75.

The pedestal had the cricular ledge or shelf of an appropriate diameter to support the ⅜ inch thick 99.95 percent alumina liner. The width of the shelf was ¼ inch and provided sufficient support to hold the liner without the need for cementing.

The liner was freely fitted within the furnace chamber and the placing of the furnace structure around and over the liner was not difficult. No cementing of the liner to the furnace body was required, although the outer parts of the furnace were sealed with a refractory cement when all the components, liner, nozzle, etc., were in place.

The burner was lit and the gas flows idled at a minimum flow rate for a short time for preheating. The gas flow rate was then increased to about 150 standard cubic feet per hour hydrogen and about 50 s.c.f.h. oxygen. The crystal seed was extended into the crystal growing zone on the support rod. After the surface of the seed crystal was fused, the powder flow was started in a small flow of oxygen. The powder-carrying oxygen stream flow was increased slightly to expand the crystal to its full diameter and then these conditions were maintained for a ten hour period, at which time the furnace temperature was about 1880° C. The crystal was grown under these conditions until it was the desired length and then the operation was terminated with the crystal allowed to cool by natural means.

The crystal grown by the above process was an alumina, 0.05 percent $Cr_2O_3$ (ruby) crystal rod having the crystal C-axis at a 60° angle to the growth axis. This ruby rod was found to have a higher degree of perfection, as shown in the table below, then a ruby rod grown under similar conditions in a furnace lacking the high purity alumina sleeve of this invention.

COMPARISON OF RUBY ROD GROWN BY NORMAL FURNACE APPARATUS AND THE APPARATUS OF THE PRESENT INVENTION

|  | Misorientation | Bubbles, ~1µ dia. | Scattering µ, amp. | Index Variations | Energy Output 84% R mirror joules |
|---|---|---|---|---|---|
| Normal Furnace | 30'-30 | Yes | .13 | ~1×10⁻³ | .7 |
| Apparatus of Present Invention | <20' | No | .05 | ~1×10⁻⁴ | 3.0 |

The crystal grown according to this invention is seen to possess a higher degree of perfection than the crystal grown with normal furnace apparatus. The crystal grown according to this invention has less misorientation, no bubbles, less scattering and index variations, and a higher energy output. The scattering was measured with the aid of a photomultiplier by directing the scattered light from the ruby rod to the cathode of the photomultiplier. The greater the scattering, the greater will be the current.

The liner of this invention can be employed in other types of crystal growing furnaces than the type shown. For example, in my copending application Serial No. 345,758 filed February 18, 1964, a crystal growing process is set forth which employs another type of furnace. The furnace apparatus shown there has a chamber, a top opening into the chamber for the introduction of a support with a seed crystal thereon into the furnace chamber, and a bottom opening into the chamber so that a burner nozzle can be positioned therein to direct powdered crystal constituent material and flames upwardly onto the surface of the seed crystal in an "upside-down" method of crystal growth.

The high purity alumina lining of this invention is advantageously utilized in the "upside-down" crystal growing furnace described above in the following manner. Referring to the drawing here, an upside-down furnace would have the burner 18 located in the pedestal opening 20 and the crystal support 22 would extend from above through the now open passageway 16. The upwardly directed flames would flow around the support rod and crystal and then out through the opening 16. The liner in such a furnace would be positioned in substantially the same manner as is actually shown in the drawing here. That is, the liner would be placed on the circular shelf 32 around the opening 20 (which would hold a burner). The liner would extend up the walls of the furnace towards the opening 16. The distance L by which the liner would extend past the crystal growing zone (located as the area in which the flames impinge upon the crystal seed surface as seen through the observation port) would be determined as before by the ratio L/I.D. where L is now the distance above the crystal growing area and I.D. is the inner diameter of the high purity alumina liner.

In another type of crystal growing operation a furnace is employed having a chamber, a top opening for the insertion of a burner nozzle directing flames and powdered crystal constituent material downward towards a crystal seed, and a second opening in the side wall of the furnace, rather than in the bottom, for the lateral insertion of a crystal support rod carrying a seed crystal into the interior of the chamber to a crystal growing zone where the flames will impinge on the seed. Devices such as these are useful for growing crystals of other than rod or boule shape, such as circular, cup-shaped, and rectilinear crystal bodies, and are shown in the following U.S. Patents: 2,852,890, W. Drost et al.; 2,962,838, R. W. Kebler et al.; and 3,077,752, D. Drost et al. The furnace apparatus employed in these processes is somewhat similar to that shown here including a pedestal except that there is no bottom opening in the pedestal but only a side opening through the walls of the furnace into the chamber in the area of the crystal growing zone. The crystal support extends through this opening and the flames and gases escape through the same opening.

A high purity alumina liner can be used in this side-opening type furnace to minimize the chance of contaminants reaching the growing crystal. The liner is supported directly on the surface of the pedestal. The liner would extend upward along the walls of the chamber and have an opening in its side wall corresponding with the opening in the side wall of the furnace. The liner would extend past the crystal growing zone to provide protection from impurities in all areas except that at the side-wall opening.

What is claimed is:

1. Apparatus for growing unicrystalline bodies comprising a furnace composed of low purity alumina and having a chamber, a first opening into said chamber, a second opening into said chamber, means for extending a support with a crystal seed thereon through said first opening into said chamber to a crystal growing zone therein, burner means in said second opening with a discharge nozzle discharging into said furnace chamber for directing flames and crystal constituent material into said chamber to impinge upon said crystal seed for crystal growth thereon, and a thermal shock resistant, noncontaminating liner consisting of at least 99.9 percent purity alumina disposed in said chamber laterally surrounding substantially all of the crystal growing zone.

2. Apparatus for growing unicrystalline bodies comprising a furnace composed of low purity alumina and having a chamber, a first opening into said chamber, a second opening into said chamber, means for extending a support with a crystal seed thereon through said first opening into said chamber to a crystal growing zone therein, burner means in said second opening with a discharge nozzle discharging into the furnace chamber for directing flames and powdered crystal constituent material into said chamber to impinge upon the crystal seed for crystal growth thereon, and a thermal shock resistant, noncontaminating liner consisting of at least 99.9 percent purity alumina disposed in said chamber and extending along the walls thereof from the opening where the flames and powdered crystal constituent material are introduced into the chamber to a point past the crystal growing zone.

3. Apparatus for growing unicrystalline bodies comprising a furnace composed of alumina of about 95 percent purity having a chamber, a top opening into said chamber, a bottom opening into said chamber, means for extending a support with a crystal seed thereon through said bottom opening into said chamber to a crystal growing zone therein, burner means in said top opening with a discharge nozzle discharging into the furnace chamber for directing flames and powdered crystal constituent material downwardly into said chamber to impinge upon the crystal seed for crystal growth thereon and then flow around said support and out the bottom opening, and a thermal shock resistant, noncontaminating liner consisting of at least 99.9 percent purity alumina disposed inside said chamber and extending vertically along the walls thereof from the roof of the chamber to a point below the crystal growing zone.

4. Apparatus for growing unicrystalline bodies comprising a furnace composed of alumina of about 95 percent purity having a cylindrically-shaped chamber having a height greater than its diameter, a top opening into said chamber, a bottom opening into said chamber, means for extending a support with a crystal seed thereon through said bottom opening into said chamber to a crystal growing zone therein, burner means in said top opening with a discharge nozzle discharging into the chamber for directing flames and powdered crystal constituent material downwardly into said chamber to impinge upon the crystal seed for crystal growth thereon and then flow around said support and out the bottom opening, and a thermal shock resistant, non-contaminating, one piece cylindrical sleeve consisting of at least 99.9 percent alumina disposed within said chamber along the vertical walls thereof and extending from the roof of the chamber to a point below the crystal growing zone.

5. Apparatus for growing unicrystalline bodies comprising a furnace composed of alumina of about 95 percent purity having a cylindrically-shaped chamber having a height greater than its diameter, a top opening into said chamber, a bottom opening into said chamber, means for extending a support with a crystal seed thereon through said bottom opening into said chamber to a crystal growing zone therein, burner means in said top opening with a discharge nozzle discharging into the furnace chamber for directing flames and powdered crystal constituent material downwardly into said chamber to impinge upon the crystal seed for crystal growth thereon and then flow around said support and out the bottom opening, and a thermal shock resistant, non-contaminating cylindrical sleeve consisting of at least 99.9 percent purity alumina supported within said chamber and extending vertically along the walls thereof from the roof of the chamber downwardly a distance L below the crystal growing zone, where the ratio of the distance L to the inner diameter of the cylindrical sleeve is between 1 and 5.

6. Apparatus for growing unicrystalline bodies comprising a furnace composed of alumina of about 95 percent purity having a cylindrically-shaped chamber having a height greater than its diameter, a top opening into said chamber, a bottom opening into said chamber, means for extending a support with a crystal seed thereon through said bottom opening into said chamber to a crystal growing zone therein, burner means in said top opening with a discharge nozzle discharging into the furnace chamber for directing flames and powdered crystal constituent material downwardly into said chamber to impinge upon the crystal seed for crystal growth thereon and then flow around said support and out the bottom opening, a thermal shock resistant, noncontaminating cylindrical sleeve consisting of at least 99.9 percent purity alumina supported within said chamber and extending vertically along the walls thereof from the top opening down past the crystal growing zone to the bottom opening, the distance L from the crystal growing zone to the bottom opening being from 1 to 5 times the inner diameter of the cylindrical sleeve.

7. Apparatus for growing unicrystalline bodies comprising a pedestal composed of alumina of about 95 percent purity having a horizontal surface with a central circular opening therein, furnace walls and roof composed of alumina of about 95 percent purity supported on said pedestal surface and arranged around said opening in a circle of greater diameter than said pedestal opening to form a structure having an internal cylindrically-shaped furnacing chamber with an annular shelf formed on said pedestal surface between the circular furnace walls and the pedestal opening, an opening in the roof of said structure into the chamber, thermal shock resistant, non-contaminating, open-ended, cylindrical sleeve consisting of at least 99.9 percent purity alumina within said chamber with its lower end supported on the annular shelf, said cylindrical sleeve extending up the walls of the chamber to the opening in the roof thereof, means for extending a support with a crystal seed thereon through the pedestal opening into said chamber to a crystal growing zone therein, burner means in said roof opening with a discharge nozzle discharging into the furnace chamber for directing flames and powdered crystal constituent material downwardly into said chamber to impinge upon the crystal seed for crystal growth thereon and then flow around said support and out the pedestal opening, the distance from the crystal growing zone to the pedestal opening being about 5 times the inner diameter of the cylindrical sleeve.

8. Apparatus for growing unicrystalline bodies comprising a pedestal composed of alumina of about 95 percent purity having a horizontal surface with a central circular opening therein, said pedestal having an internal bell-shaped chamber communicating with and underlying the central opening, at least two exhaust passages extending laterally and upwardly through the walls of the pedestal from the bell-shaped chamber to the exterior of the pedestal, a vertical passage from the bottom central point of the bell-shaped chamber extending down through the pedestal base, furnace walls and roof composed of alumina of about 95 percent purity supported on said pedestal and arranged around said central opening in a circle of greater diameter than said pedestal opening to form a structure having an internal cylindrically-shaped furnace chamber with an annular shelf formed on said pedestal surface between the circular walls and the pedestal opening, an opening in the roof of structure into the furnace chamber, a thermal shock resistant, non-contaminating, open-ended, cylindrical sleeve consisting of at least 99.9 percent purity alumina within said chamber with its lower end supported on the annular shelf, said sleeve extending up the walls of the chamber to the opening in the roof thereof, means for extending a support with a crystal thereon through the vertical passage in the pedestal base, through the bell-shaped chamber and pedestal opening into the furnace chamber to a crystal growing zone therein, burner means in said roof opening with a discharge nozzle discharging into the furnace chamber for directing flames and powdered crystal constituent material downwardly into said chamber to impinge upon the crystal seed for crystal growth thereon and then flow around said support, out the pedestal opening into the bell-shaped chamber and thence out the exhaust passages, the distance from the crystal growing zone to the pedestal opening being about 5 times the inner diameter of the cylindrical sleeve.

9. Apparatus for growing unicrystalline bodies comprising a furnace composed of alumina of about 95 percent purity having a cylindrical-shaped chamber, said cylindrical chamber having a height greater than its diameter, a top opening into said chamber, bottom opening into said chamber, means for extending a support with a crystal seed thereon through said top opening into said chamber to a crystal growing zone therein, burner means in said bottom opening with a discharge nozzle discharging into the furnace chamber for directing flames and powdered crystal constituent material upwardly into said chamber to impinge upon the crystal seed for crystal growth thereon and then flow around said support and out the top opening, a thermal shock resistant, non-contaminating cylindrical sleeve consisting of at least 99.9 percent purity alumina supported within said chamber and extending vertically along the walls thereof from the bottom opening up past the crystal growing zone to the top opening, the distance L from the crystal growing zone to the top opening being about 5 times the inner diameter of the cylindrical sleeve.

10. Apparatus for growing unicrystalline bodies comprising a pedestal composed of alumina of about 95 percent purity having a horizontal surface with a central opening therein, furnace walls and roof composed of alumina of about 95 percent purity supported on said pedestal surface and arranged around said opening in a circle of greater diameter than said pedestal opening to form a structure having an internal cylindrically-shaped furnacing chamber, an opening in the roof of said structure into the chamber, an annular channel in said pedestal surface between the circular furnace walls and the pedestal opening, a thermal shock resistant, non-contaminating, open ended cylindrical sleeve consisting of at least 99.9 percent purity alumina within said chamber with one end set in the annular channel, said cylindrical sleeve extending up the walls of the chamber to the opening in the roof thereof, means for extending a support with a crystal seed thereon through the roof opening into the chamber to a crystal growing zone therein, burner means in the pedestal opening with a discharge nozzle discharging into the furnace chamber for directing flames and powdered crystal constituent material upwardly into said chamber to impinge upon the crystal seed for crystal growth thereon and then flow around said support and out the roof opening, the distance from the crystal growing zone to the top opening being about 5 times the inner diameter of the cylindrical sleeve.

11. Apparatus for growing unicrystalline bodies comprising a pedestal composed of alumina of about 95 percent purity having a horizontal surface, furnace walls and roof composed of alumina of about 95 percent purity supported on said pedestal surface and arranged in a circle thereon to form a structure having an internal cylindrically-shaped furnace-chamber, an opening in the roof of said structure into the chamber, a lateral opening in a wall of said structure into said chamber, an annular channel in said pedestal surface within the circle of the furnace walls, a thermal shock resistant, noncontaminating, open-ended cylindrical sleeve consisting of at least 99.9 percent purity alumina within said chamber with one end set in the annular channel, said cylindrical sleeve extending up the walls of the chamber to the opening in the roof thereof, said sleeve having a lateral opening in its side corresponding to and communicating with the lateral opening in the wall of the furnace, means for extending a support with a crystal seed thereon through said furnace wall opening and said sleeve opening into said chamber to a crystal growing zone therein, burner means in said roof opening with a discharge nozzle discharging into the furnace chamber for directing flames and powdered crystal constituent material into said chamber to impinge upon the crystal seed for crystal growth thereon and then flow around said support and out the lateral opening.

References Cited by the Examiner
UNITED STATES PATENTS

| | | | |
|---|---|---|---|
| 2,015,766 | 10/1935 | Stockstrom et al. | 158—99 X |
| 2,561,200 | 7/1951 | Hess | 158—116 X |
| 2,652,890 | 9/1953 | Morck et al. | 158—116 X |
| 2,942,941 | 6/1960 | Merker | 23—273 X |
| 3,190,727 | 6/1965 | Vunderink | 23—273 X |

OTHER REFERENCES

Preparation of Single Crystals, Lawson et al., Butterworth Scientific Publications, 1958, pages 29–30.

NORMAN YUDKOFF, *Primary Examiner.*

G. P. HINES, *Assistant Examiner.*